United States Patent [19]
Stahl

[11] 3,913,435
[45] Oct. 21, 1975

[54] MACHINE FOR TRIMMING THE EDGES OF METAL CONTAINERS

[75] Inventor: William J. Stahl, Somerville, N.J.

[73] Assignee: National Manufacturing Company, Chatham, N.J.

[22] Filed: July 5, 1974

[21] Appl. No.: 485,884

[52] U.S. Cl. ............................................. 83/193
[51] Int. Cl.² ...................................... B23D 21/14
[58] Field of Search ........ 113/120 N, 7; 83/193, 98, 83/54

[56] References Cited
UNITED STATES PATENTS

| | | | |
|---|---|---|---|
| 925,070 | 6/1909 | Adams | 83/193 X |
| 2,074,547 | 3/1937 | Hessenbruch | 83/193 X |

*Primary Examiner*—Milton S. Mehr

[57] ABSTRACT

A trimming machine including reciprocable shear blades which shape the open ends of metal containers. A mandrel formed with shear edges cooperates with the shear blades to remove the desired amount of metal. The shear blades are operated by toggle links coupled to a platen and a powered reciprocating means. When the platen is in one position one set of alternately spaced cutters are in their cutting position. When the platen is in its opposite position other cutters are in their cutting position. Rapid set up for a variety of shapes and sizes is provided by the interchangability of cutters and links.

1 Claim, 7 Drawing Figures

FIG. 2
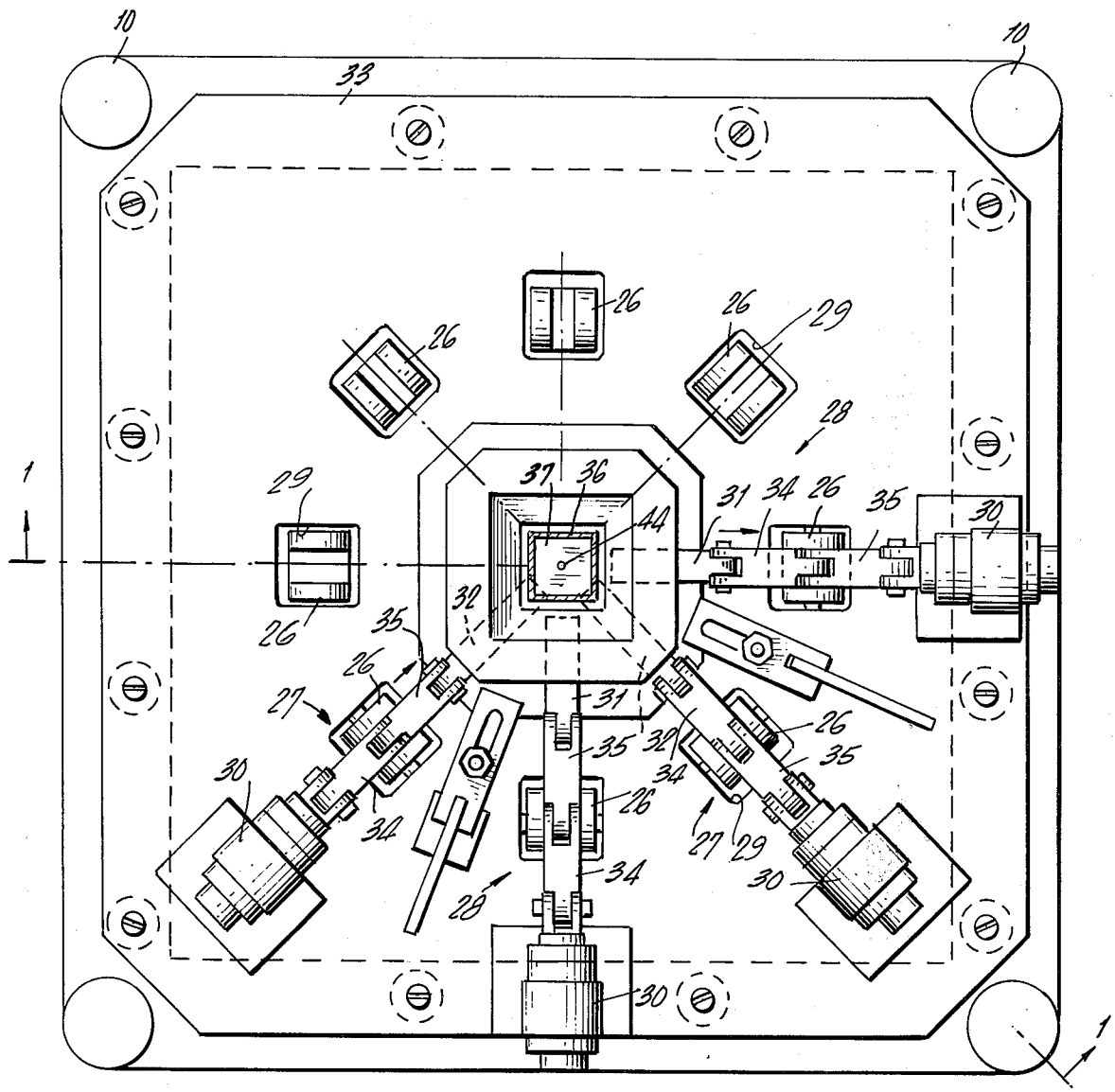
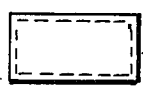
FIG. 6
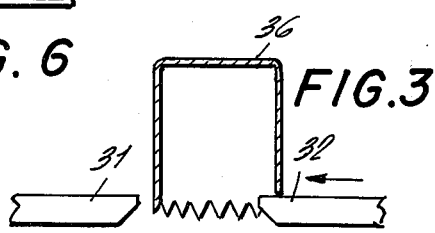
FIG. 3
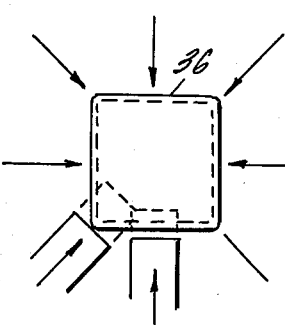
FIG. 4
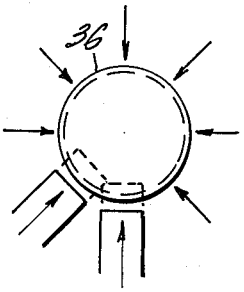
FIG. 5
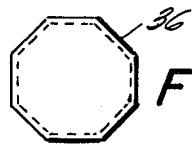
FIG. 7

MACHINE FOR TRIMMING THE EDGES OF METAL CONTAINERS

BACKGROUND OF THE INVENTION

Metal containers cups, lids and the like formed by a deep draw process always have irregular open ends which must be trimmed to a desired length and shape. Since the open ends of such containers, lids, and boxes are unsupported and of thin gauge the trimming operation cannot be done on a conventional punch press. The present invention uses a plurality of sliding shear blades arranged around the open end of the container to trim the open ends by a shearing action. Prior trimming machines have used a number of shear blades around the open end of a container and employ two cycles of the machine to provide a complete trim, one cycle for half the blades in alternate array, and the second cycle to use the other blades. In the present invention the cutting blades partially overlap one set in a first half of a cycle, the other set in the second half of the same cycle.

A feature of the present invention is the toggle action which permits a single power eccentric to operate all the blades in a single cycle.

Another feature of the present invention is its rapid adaptability to a wide variety of shapes and sizes.

SUMMARY

The trimming machine comprises a mandrel for supporting a container in a trimming position, the mandrel formed with a shearing edge adjacent to the open end of the container. A plurality of cutting blades are angularly positioned around the mandrel normal thereto and are divided into two or more sections. A toggle linkage is coupled to each of the cutting blades and the toggle links are operated by reciprocating links secured to a platen. A power means, including a motor, is connected to the platen for first moving it in one direction to move some of the cutting blades into and out of a shearing position, and for then moving the platen in a reverse direction to move other cutting blades (section) into and out of a shearing position. This double movement accomplished in a single machine cycle completely trims and shapes the open end of the container.

Additional details of the invention will be disclosed in the following description, taken in connection with the accompanying drawings.

BRIEF DESCRIPTION OF THE FIGURES

FIG. 2 is a top view of the machine, showing the support mandrel and the spaced cutting blades.

FIG. 3 is a partial cross sectional view of a container and two cutter blades.

FIGS. 4 through 7 are top views of containers having various shapes adapted to be trimmed by the machine.

DESCRIPTION OF THE PREFERRED EMBODIMENT

Figure 1:
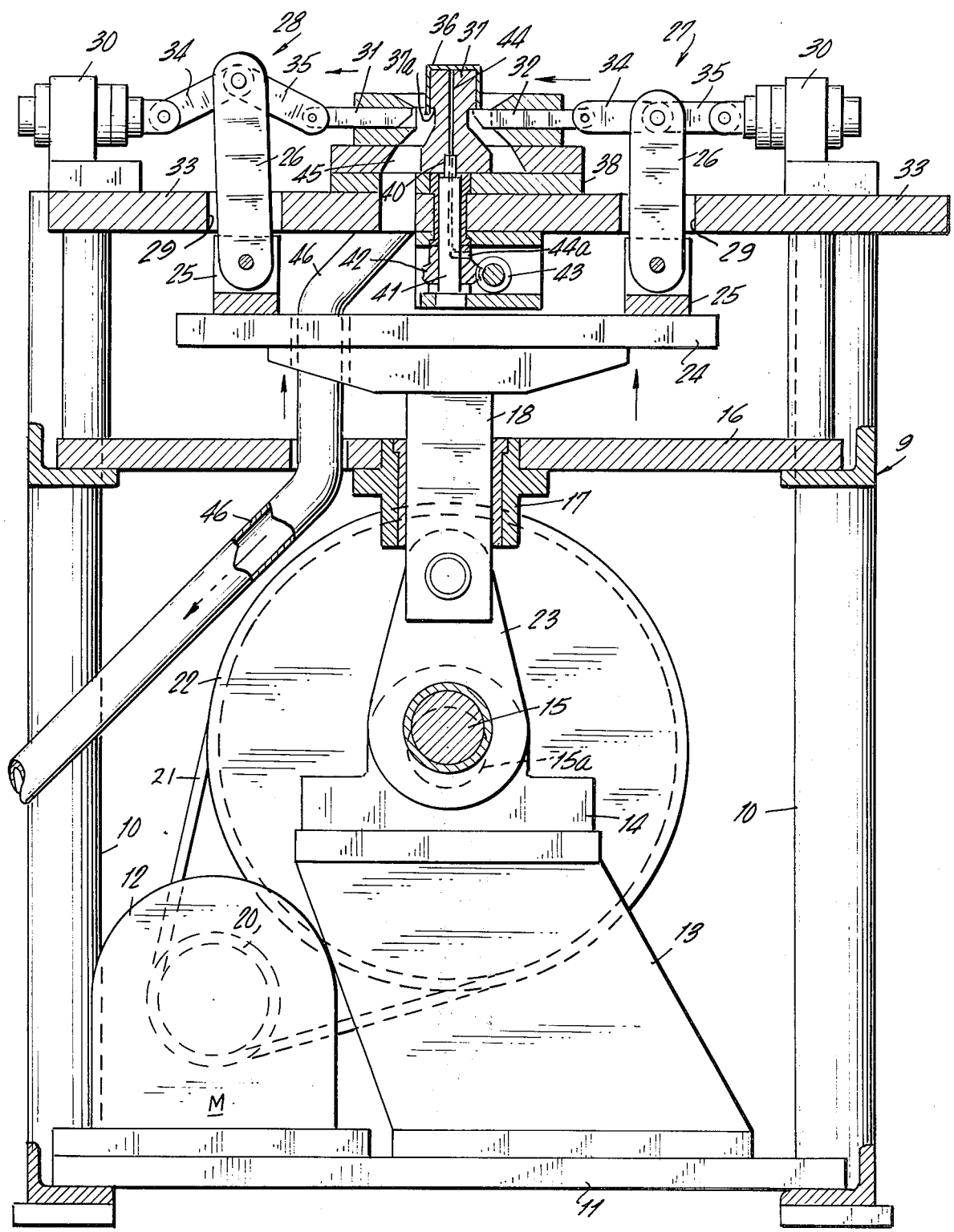
FIG. 1 is a view in side elevation, partly in section of a trimming machine made in accordance with the present invention.

Referring to FIGS. 1 and 2, the trimming machine 9, is supported on four posts 10 to which are secured a base plate 11. An electric motor 12, and a mount 13 which carries a bearing 14 are secured to the base plate 11. The bearing 14 carries a large shaft 15. The posts 10 also support a second plate 16 having a guide 17 for positioning a stub shaft 18. The motor 12 is connected, by a pulley 20 and belt 21, to a large pulley 22 which also acts as a flywheel. Pulley 22 is secured to shaft 15 on which rides an eccentric cam 15a. A coupling arm 23, connects the stub shaft 18 to the eccentric 15a on shaft 15.

Stub shaft 18 is secured to a plate 24 on which are mounted a plurality of bearing supports 25. Supports 25 each swingably receive one end of a vertical link 26 which is coupled at its other end to toggle links. The toggle links 27, 28 are connected between fixed mounts 30 and the cutter blades 31, 32. The mounts 30 are secured to a table 33 which is provided with openings 29 for the passage of vertical links 26.

The toggle joints 27, 28 are formed by toggle links 34, 35 and their respective pivots as shown in FIG. 1. The toggle joints 27, 28 are pivotally coupled to the mounts and the cutter blades respectively. The toggle joints 27, 28 are coupled to the vertical links 26 and said links are selected as to length so that one or more toggle links 34, 35 are in one position such as the alignment shown at the right in FIG. 1 when plate 24 is in its upper position and the cutter blades are at the end of their cutting stroke, while other toggle links are in other positions such as the retracted position shown at the left of FIG. 4. When plate 24 is moved down to its lower position, the advanced cutter blades are retracted and the previously withdrawn blades are advanced into a cutting position.

From the above description it is evident that one or more of the cutter blades trim when the plate 24 moves up and the other cutter blades trim when the plate moves down. This type of program permits the cutter blades to partially overlap as they perform their cutting operation and insures that the edges of the container are free of burrs and irregularities.

The mandrel 37 is secured to a supporting plate 38 by means of a threaded screw 40, formed as part of a spindle 41 and turned by a gear 42 which meshes with a worm gear 43. This type of construction permits a quick change of mandrels when containers of different sizes are to be trimmed on the same machine. Worm gear 43 is operated by a rod and screw head (not shown) available at one side of the machine.

The container 36 or other work part is slipped upon a mandrel 37 which substantially conforms in shape to the work part. A shearing edge 37a which corresponds to the finished length and shape of the work part is also provided on the mandrel. An axial bore 44 in the mandrel connects with a bore in the spindle 41 which is communication with a source of air under pressure (not shown) in series with a push button valve. After a trimming action, the operator presses the button and the compressed air removes the container 36 from the mandrel 37 ready for another untrimmed container.

An annular space 45 is provided around the base of the mandrel 37. A connecting conduit 46 has an exit port external of the machine and permits the container chips to leave the cutting area by this route. A vacuum chamber (not shown) joined to conduit 46 helps to draw all the chips from space 45.

The operation of this machine is evident from the above description. After the container has been placed on the mandrel with the cutter blades in a neutral position, the machine is started and after a single revolution of pulley 22, the compressed air may be used to eject a container with trimmed edges. The neutral position is half way between the upper and lower positions of the platen 24 when all toggle joints are partially retracted. During the operation, when the eccentric 15a on shaft 15 moves the plate to the upper position (as shown in FIG. 1) alternate blades 32 are moved into the trimming position and into shearing relationship with mandrel edges 44a. When the shaft 15 moves the plate 24 to its lower position, blades 31 are moved to their trimming position while blades 32 are retracted. The cycle is complete when the eccentric 15 moves the platen 24 to a median or neutral position.

The cross sectional view shown in FIG. 3 illustrates one of the edges that can be produced on the machine described by using appropriately shaped cutters.

FIGS. 4 through 7 show the shapes of the containers that can be trimmed when used with appropriate mandrels and cutters.

Adjustment of the length of cutter travel and sequence of operations to accommodate different shapes is quickly achieved by selecting toggle and vertical links of proper length.

Having thus fully described the invention, what is claimed as new and desired to be secured by Letters Patent of the Unites States is:

1. A machine for trimming the open ends of containers comprising:
   a. a mandrel to receive and support a container in a trimming position, said mandrel formed with a shearing edge spaced from the open end of the container;
   b. a plurality of cutting blades around the mandrel and normal thereto;
   c. a toggle linkage freely coupled at one end to each of said cutting blades;
   d. a source of reciprocal power comprising a motor, a first pulley on said motor, a second pulley drivably coupled to the first pulley, a shaft for said second pulley and an eccentric carried by the said shaft;
   e. a plate secured to said reciprocal power sources;
   f. link members of selective length to couple the said plate to the toggle linkages whereby the cutting blades are alternately moved into and out of cutting positions in a desired sequence.

* * * * *